United States Patent Office
3,647,742
Patented Mar. 7, 1972

3,647,742
TREATMENT OF ALUMINA FILLERS WITH SILANE COUPLING AGENTS FOR EPOXY RESINS
John J. Stevens, Jr., Highland Park, N.J., assignor to Union Carbide Corporation, New York, N.Y.
No Drawing. Filed Nov. 7, 1969, Ser. No. 874,972
Int. Cl. C08g 51/04
U.S. Cl. 260—37 EP     21 Claims

ABSTRACT OF THE DISCLOSURE

Organo-functional silane coupling agents are employed to treat hydrated alumina incorporated filler in cycloaliphatic epoxy resin compositions.

---

This invention relates to the incorporation of organofunctional silane coupling agents into hydrated alumina-filled epoxy resins, said incorporation resulting in a material characterized by excellent toughness in terms of improved tensile strength and percent elongation. Specifically, this invention is further characterized by a composition of a cycloaliphatic polyepoxide, a polycarboxylic acid anhydride curing agent, a hydrated alumina filler, and an epoxy-functional silane coupling agent capable of reacting with the curing agent. More specifically, this invention is further characterized by a composition of a cycloaliphatic polyepoxide, a polycarboxylic acid anhydride curing agent, alumina trihydrate filler characterized by a low soluble sodium content and an epoxy functional silane coupling agent capable of reacting with the curing agent.

Copending application Ser. No. 734,239, now Pat. No. 3,563,939 issued Feb. 16, 1971, discloses the desirable electrical properties achieved by employing organic insulating components composed of a cured polyepoxide admixed with a low alkaline metal content hydrated alumina. While such compositions offer superior electrical insulating properties, as measured by the values for dissipation factor and dielectric constant, these same compositions do not have that degree of toughness, as measured by tensile strength and elongation, which is desired for commercial electrical insulating materials. Hydrated alumina is known to be a relatively poor reinforcing filler for epoxy resins when compared with fillers such as silica.

It is found that the presence of measured quantities of organo-functional silane coupling agents in hydrated alumina-filled epoxy resins results in substantial improvements in the aforementioned toughness characteristics. This is evidenced by an approximate increase in tensile strength of 50 percent and an increase in percent elongation by about 100 percent, when the silane-treated composition is compared to an equivalent composition absent the organo-functional silane. The result is surprising in view of the fact that silane coupling agents have been regarded highly for their ability to enhance wet flexural strength of filled plastics.

The improved composition of this invention comprises hydrated alumina-filled polyepoxide resin containing an organo-functional silane coupling agent or the hydrolyzates and condensates thereof, said silanes being those encompassed by the general formula:

XR'SiY₃ wherein R' is a saturated hydrocarbon radical containing at least 3 carbon atoms in sequence separating X from Si and bonded to both; X is a functional group which is condensible with a carboxylic acid group such as

$H_2N-$, $HS-$, $O=C=N-$ and the like; Y is any hydrolyzable group such as alkoxy, aroxy, halogen, amino, and the like. It should be understood that in the case of silane, when X is $O=C=N$, the same functional group is not to be found in the siloxane since isocyanates are unstable to hydrolysis. However, the reaction product of isocyanate with water forms

which is a functional group pursuant to this invention. The isocyanate group can be put into the siloxane by phosgenation of an amino substituted siloxane followed by dehydrohalogenation. The siloxane will still be capable of further reaction and will securely bond to the inorganic substrate.

Specific illustrations of the aforementioned silanes are the following:

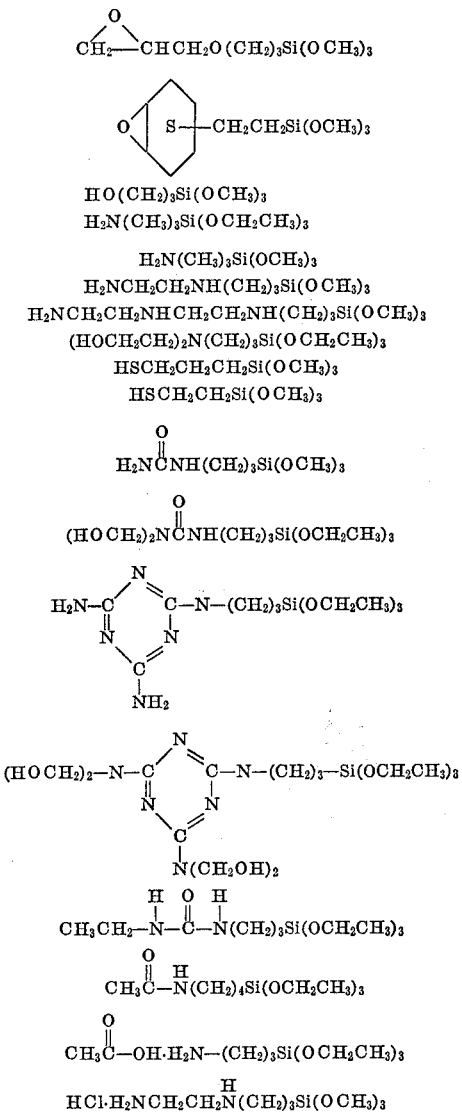

The amount of silane which may be employed in the epoxy resin composition of this invention is about 0.1 to about 5.0 weight percent, based on the weight of hydrated alumina filler in the composition. Preferably, the silane content is about 0.2 to 2.5 weight percent (same basis).

The polyepoxide materials which are contemplated are those which have more than one vicinal epoxy group, i.e., more than one

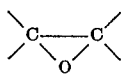

group, which group may be in a terminal position, i.e., a

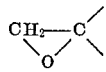

group, or in an internal position, i.e., a

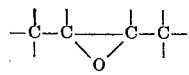

group. The polyepoxides have cycloaliphatic structures and may be employed alone or in admixture with polyepoxides containing aromatic, or heterocyclic structures. The epoxides may be substituted with substituents such as hydroxyl, alkyl, alkoxy, etc.

Preferred cycloaliphatic polyepoxides which are contemplated are those which contain at least one oxirane oxygen atom bonded to two vicinal cycloaliphatic carbon atoms. In different language, the polyepoxide component contains at least one vicinal epoxy group, i.e.,

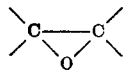

the epoxy carbon atoms of which form a portion of a cycloaliphatic hydrocarbon nucleus. The cycloaliphatic nucleus preferably contains from 5 to 7 carbon atoms including the epoxy carbon atoms.

Saturated polyepoxides which contain all the oxirane oxygen atoms bonded to vicinal cycloaliphatic carbon atoms are preferred. Of course, it is readily apparent to epoxy chemists that only one oxirane oxygen can be chemically bonded to any pair of vicinal or adjacent carbon atoms. Saturated diepoxides which contain both oxirane oxygen atoms bonded to cycloaliphatic carbon atoms are highly preferred. Polyepoxides which contain solely carbon, hydrogen, and oxygen atoms are especially preferred. The oxygen atoms can be (in addition to oxirane oxygen) etheric oxygen, i.e., —O—; oxygen present in an ester group, i.e.,

oxygen present in a carbonyl group, i.e.,

and the like. A single polyepoxide or a mixture of at least two polyepoxides can be employed in the novel curable compositions.

Illustrative polyepoxides include, for example, the alkanediol bis(3,4 - epoxycyclohexane carboxylates, the alkanediol bis(lower alkyl substituted-3,4-epoxycyclohexanecarboxylates), the oxaalkanediol bis(lower alkyl substituted-3,4-epoxycyclohexanecarboxylates), the alkanetriol tris(3,4 - epoxycyclohexanecarboxylates), the alkenetriol tris(3,4-epoxycyclohexenecarboxylates), the alkanetriol tris(lower alkyl substituted-3,4-epoxycyclohexanecarboxylates), the oxaalkanetriol tris(3,4-epoxycyclohexanecarboxylates), the oxaalkanetriol tris(lower alkyl substituted-3,4-epoxycyclohexanecarboxylates), and the like. The expression "lower alkyl" as used herein means an alkyl radical which contains from 1 to 4 carbon atoms.

Other polyepoxides contemplated include, for instance, the bis(3,4-epoxycyclohexylmethyl) hydrocarbon dicarboxylates and the bis(lower alkyl substituted-3,4-epoxycyclohexylmethyl) hydrocarbon dicarboxylates, e.g., bis(3,4-epoxycyclohexylmethyl) oxalate,
bis(3,4-epoxycyclohexylmethyl) malonate,
bis(3,4-epoxycyclohexylmethyl) succinate,
bis(3,4-epoxycyclohexylmethyl) glutarate,
bis(3,4-epoxycyclohexylmethyl) adipate,
bis(3,4-epoxycyclohexylmethyl) tetrahydrophthalate,
bis(3,4-epoxycyclohexylmethyl) hexahydrophthalate,
bis(3,4-epoxycyclohexylmethyl) phthalate, and the like.

Other desirable polyepoxides include the monoesters of 3,4-epoxycyclohexylmethanols and 3,4-epoxycyclohexanecarboxylic acids such as, for example, 3,4-epoxycyclohexylmethyl 3,4-epoxycyclohexanecarboxylate,
1-methyl-3,4-epoxycyclohexylmethyl 1-methyl-3,4-epoxycyclohexanecarboxylate,
6-methyl-3,4-epoxycyclohexylmethyl 6-methyl-3,4-epoxycyclohexanecarboxylate,
2-ethyl-3,4-epoxycyclohexylmethyl 2-ethyl-3,4-epoxycyclohexanecarboxylate,
4-n-propyl-3,4-epoxycyclohexylmethyl 4-n-propyl-3,4-epoxycyclohexanecarboxylate,
5-isobutyl-3,4-epoxycyclohexylmethyl 5-isobutyl-3,4-epoxycyclohexanecarboxylate,
lower alkyl substituted -3,4-epoxycyclohexylmethyl lower alkyl substituted-3,4-epoxycyclohexanecarboxylate,
halo substituted-3,4-epoxycyclohexylmethyl halo substituted-3,4-epoxycyclohexanecarboxylate,
1-chloro-3,4-epoxycyclohexylmethyl 1-chloro-3,4-epoxycyclohexanecarboxylate,
2-bromo-3,4-epoxycyclohexylmethyl 2-bromo-3,4-epoxycyclohexanecarboxylate, and the like.

Illustrative of the polyepoxides which may be blended with the above cycloaliphatic epoxides, typically up to equal parts by weight, include, for example, the epoxy polyethers of polyhydric phenols obtained by reacting a polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxy-phenyl) propane (Bisphenol-A), 2,2-bis-(4-hydroxyphenyl)butane, 4,4'-dihydroxybenzophenone, bis(4 - hydroxyphenyl)ethane, 2,2-bis(4-hydroxyphenyl) pentane and 1,5-dihydroxynaphthalene. The halogen-containing epoxides may be further exemplified by epichlorohydrin, 3-chloro-1,2-epoxybutane, 3-bromo-1,2-epoxyhexane, 3-chloro-1,2-epoxyoctane, and the like. By varying the ratios of the phenol and epichlorohydrin one obtains different molecular weight products as shown in U.S. 2,633,458.

A preferred group of the above-described epoxy polyethers of polyhydric phenols are polyglycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C. to 150° C. The heating is continued for several hours to effect the reaction and the product is then washed free of salt and base.

A preferred class of polyepoxides are the diglycidyl polyethers of dihydric phenols which have the following formula:

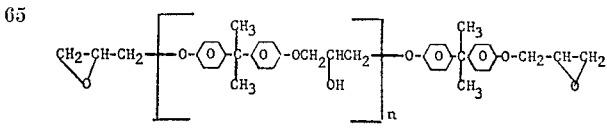

wherein $n$ has a value from zero to about 10, preferably from 0 to about 2.

Further useful polyepoxides for use in admixture with the cycloaliphatic epoxides include, 4-vinylcyclohexene dioxide, dicyclopentadiene dioxide, and the like.

Curing agents for the foregoing polyepoxides include suitable curing catalysts and/or organic hardeners.

Basic and acidic catalysts which can be employed in the curable compositions include, for example, the metal halide Lewis acids, e.g., boron trifluoride, aluminum chloride, zinc chloride, stannic chloride, ferric chloride, boron trifluoride-piperidine complex, boron trifluoride-1,6-hexanediamine complex, boron trifluoride-monoethylamine complex, boron, trifluoride-dimethyl ether complex, boron trifluoride diethyl ether complex, boron trifluoride-dipropyl ether complex, and the like; the strong mineral acids, e.g. sulfuric acid, phosphoric acid, polyphosphoric acid, perchloric acid, and the like; the saturated aliphatic hydrocarbon sulfonic acids and the aromatic hydrocarbon sulfonic acids, e.g., ethylsulfonic acid, propylsulfonic acid, benzenesulfonic acid, toluenesulfonic acid, naphthalenesulfonic acid, lower alkyl substituted-benzene-sulfonic acid, and the like; the alkali metal hydroxides, e.g., sodium hydroxide, potassium hydroxide, and the like; the amines, e.g., alphamethylbenzyldimethylamine, dimethylethylamine, triethylamine, tripropylamine, trimethylammonium hydroxide, and the like. When the catalyst and curable compositions are immiscible, the catalyst can be added as a solution in an inert normally-liquid organic medium. Typical media for the catalysts include the organic ethers, e.g., diethyl ether, dipropyl ether, and the like; the organic esters, e.g., methyl acetate, ethyl acetate, methyl propionate, ethyl propionate, and the like; the organic ketones, e.g., acetone, cyclohexanone, methylcyclohexanone, and the like.

Where a catalyst is utilized, the amount employed will, of course, vary depending upon the particular catalyst selected and the nature of the polyepoxide. Generally, the amount of catalyst used will be up to about 10 percent by weight of the polyepoxide.

Hardeners that may be used to cure the polyepoxide include various polyfunctional materials capable of reacting with the polyepoxide, such as, e.g., polycarboxylic acids (including polycarboxy polycaprolactone); polyfunctional amines (containing at least two —NHR groups wherein R may be H or an organic radical such as alkyl, cycloalkyl, or aryl, such radical optionally being substituted); polyols such as polyhydric alcohols, polyhydric phenols, polycaprolactone polyols; polycarboxylic acid anhydrides; etc.

Polycarboxylic acid anhydrides constitute a preferred class of hardeners. Suitable polycarboxylic acid anhydrides include the aliphatic, aromatic, and cycloaliphatic acid anhydrides. Illustrative polycarboxylic acid anhydrides include, for example, phthalic anhydrides, tetrahydrophthalic anhydride, hexahydrophthalic anhydride, chlorendic anhydride, glutaric anhydride, adipic anhydride, 1,2-naphthalic anhydride, and the like.

Suitable polyols which may be employed as a component in the curable formulation include those organic compounds which have at least two hydroxy groups, which are alcoholic hydroxy groups, phenolic hydroxy groups, or both alcoholic and phenolic hydroxy groups. The term "polyol" preferably encompasses the polyhydric alcohols and the polyhydric phenols. The polyhydric alcohols, i.e., those composed solely of carbon, hydrogen and oxygen, are highly preferred. Illustrative of the polyols contemplated include, for example, the aliphatic and cycloaliphatic polyhydric alcohols, e.g., ethylene glycol, diethylene glycol, the polyethylene glycols, 1,2-propylene glycol, the poly-1,2-propylene glycols, the polyethylene-poly-1,2-propylene glycols, trimethylene glycol, the butanediols, the pentanediols, 2-ethyl-1,3-hexanediol, the hexenediols, 2-methoxy-2,3-dimethyl - 1,5 - pentanediol, polyglycerol, 1,1,1-trimethylolpropane, pentaerythritol, sorbitol, the polyvinyl alcohols, resorcinol, catechol, pyrogallol, hydroquinone, the dihydroxytoluenes, dihydroxyxylene, 1,9 - naphthalenediol, polytetramethyleneoxide diols and the like. The alkylene oxide adducts, e.g., ethylene oxide, 1,2-propylene oxide, etc., of polyhydric alcohols or polyhydric phenols such as those illustrated above also are highly suitable. Mixtures of polyols are also suitable.

The initiated polycaprolactone polyols and/or polycaprolactone polycarboxys (hereinafter termed initiated products for sake of brevity) which contain free hydroxyl groups and/or carboxyl groups represent preferred polyols. These initiated products are formed by reacting, at an elevated temperature, for example, at a temperature of from about 50° C. to about 250° C., an admixture containing a lactone and polyfunctional organic initiator; said lactone being in molar excess with relation to said initiator; said lactone having from six to eight carbon atoms in the lactone ring and at least one hydrogen substituent on the carbon atom which is attached to the oxy group in said ring; said organic initiator having at least two reactive hydrogen substituents preferably of the group of hydroxyl, primary amino, secondary amino, carboxyl, and mixtures thereof, each of said reactive hydrogen substituents being capable of opening the lactone ring whereby said lactone is added to said initiator as a substantially linear group thereto; said initiated lactone polyesters possessing, on the average, at least two of said linear groups, each of said linear groups having a terminal oxy group at one end, a carbonyl group at the other end, and an intermediate chain of from five to seven carbon atoms which has at least one hydrogen substituent on the carbon atom in said intermediate chain that is attached to said terminal oxy group. These initiated products will contain at least two hydroxyl groups and/or at least two carboxyl groups or mixtures of such groups, depending, of course, on the initiator and reactants employed. A more complete discussion of such polycaprolactone polyols and polycaprolactone polycarboxys is given in U.S. Pat. 3,169,945, the contents of which are incorporated herein by reference.

It is desirable that the relative proportions of polyepoxide, polycarboxylic acid anhydride, and polyol comprising the curable composition are such as to provide from about 0.16 to about 5.0 carboxy groups, —COOH, of said anhydride and up to about 2.0 hydroxy groups, —OH, of said polyol per epoxy group of said polyepoxide.

It should be noted that by the expression "carboxyl groups of said polycarboxylic acid anhydride" is meant the carboxy groups which would be contained by the corresponding polycarboxylic acid. In other words, by the expression "carboxy groups of polycarboxylic acid anhydride" is meant the carboxyl groups contained in the "hydrated" polycarboxylic acid anhydride.

It is preferred that the relative proportions of polyepoxide, polycarboxylic acid anhydride, and polyol are such as to provide from about 0.33 to about 4.0 carboxy groups of said anhydride and from about 0.16 to about 2.0 hydroxy of said polyol, per epoxy group of said polyepoxide.

Alumina hydrate used in this invention is defined by the chemical formula $Al_2O_3 \cdot xH_2O$, wherein $x$ has any value between 1 and 3. Alumina trihydrate, $Al_2O_3 \cdot 3H_2O$, is particularly preferred. As noted, it is desirable for good electrical insulating properties, that such alumina hydrate have a total alkaline metal content, expressed as metal oxide, of not greater than about 0.40% by weight, preferably not greater than about 0.25% by weight, determined on a calcined basis, and a soluble alkali metal content, expressed as free sodium, not greater than 500 parts per million by weight, and preferably not greater than 100 parts per million by weight, on a hydrated basis. This disclosure is not limited to low alkaline metal content alumina hydrate fillers but such fillers provide a better electrical insulating product. Commercially available "pure" alumina hydrates are generally relatively free of most alkaline metals. Such commercial alumina hydrates do contain, however, sodium as an impurity. Thus, when we make reference to alumina hydrate having "a low alkaline metal content," inasmuch as sodium is the chief alkali metal present, then as a practical matter, in most instances such reference will relate to an alumina hydrate having a low sodium content. By "alkaline metal," we mean alkali metals from Group I of the Periodic Table, for example lithium, sodium and potassium, and alkaline earth metals from Group II of the Periodic Table for example beryllium, magnesium, calcium, strontium and barium. Thus, the alumina hydrate filler, when electrical insulation is contemplated, should be characterized by a total alkaline metal content, expressed as metal oxide, of not greater than 0.40% by weight determined on a calcined (i.e. crystal water free) basis, and preferably not greater than 0.25% by weight determined on a calcined basis. In addition, it is desirable that the total soluble alkaline metal content of the alumina hydrate, expressed as free sodium, be not greater than approximately 500 parts per million by weight, and preferably not greater than approximately 100 parts per million by weight of the hydrated alumina. For best physical properties such hydrated alumina particles are processed by crushing, to thereby form more discrete, rough, irregularly shaped particles. Such rough particles have markedly better reinforcing characteristics, as disclosed in the prior art.

Desired properties of the hydrated alumina filler pursuant to this invention are listed in the table below. Hydrated alumina filler, as represented by the values in the preferred range, was employed in Samples 1 and 2 of the example.

| Property | General range | Preferred range |
| --- | --- | --- |
| Total sodium content, expressed as $Na_2O$ (calcined wt. basis) percent | ≤0.40 | ≤0.25 |
| Soluble Sodium content, expressed as $Na_2O$ (calcined wt. basis) percent | ≤0.050 | ≤0.019 |
| $Al_2O_3$ (percent) | 60–65 | 64–65 |
| $SiO_2$ (percent) | <0.02 | <0.01 |
| $Fe_2O_3$ (percent) | <0.02 | <.008 |
| $H_2O$, absorbed (percent) | <0.5 | <0.2 |
| Bulk density, loose (lbs./ft.³) | 10–110 | 40–80 |
| Bulk density, packed (lbs./ft.³) | 20–130 | 50–100 |
| Specific gravity, (gm./cc.) | 2.42 | 2.42 |
| Average particle size, (microns) | 1–100 | 6–10 |
| Particle type | (¹) | (¹) |

¹ Crushed precipitate.

It is noted that the procedure for determining soluble sodium is as follows: Three clean 400 mil beakers that have been rinsed with, mixed-bed, deionized water are set on a balance. Then a 10 gram sample of hydrated alumina is weighed into two of the beakers. Two hundred grams of distilled water (hot) is added to all three beakers. Boil gently for one hour with a cover glass over the beakers. Mixtures are left to cool to 25° C. Then transfer the mixture to a 500 ml. volumetric flask and deionized water to level. Shake well and allow to stand. Filter mixture through one No. 42 filter paper. Measure the soluble sodium content of the solutions on Beckman DU flame spectrophotometer and calculate the parts per million soluble sodium on the sample by subtracting the sodium content of the blank from that of the filler containing solutions. It is further noted that sodium as well as its various salts can easily contaminate these solutions, thus careful attention is needed to obtain representative results. A potassium dichromate solution is recommended for cleaning glassware.

As previously noted, a preferred system in accordance with our invention utilizes an organo-functional silane coupling agent in conjunction with (1) a cycloaliphatic polyepoxide, (2) a polycarboxylic acid anhydride, (3) low alkaline alumina hydrate filler, (4) a polyol, and optionally (5) a lactone.

Although a caprolactone is preferred in the foregoing system, it is to be noted that other lactones also are suitable. In general, the lactone should contain from 3 to 8 carbon atoms in the heterocyclic ring. Lactones that may be employed include, by way of example, beta-propiolactone; dialkyl-substituted propiolactones such as the dimethyl-, diethyl-, and dipropylpropiolactones, e.g., alpha, alpha-dialkyl-beta-propiolactones such as alpha, alpha-dimethyl-beta-propiolactone; delta - valerolactones such as methyl- and ethyl-substituted delta-valerolactones; epsilon caprolactone; and substituted epsilon-caprolactones such as mono-, di-, and trialkyl substituted epsilon-caprolactones, e.g., methyl- and ethyl-substituted epsilon-caprolactones; zeta-enantholactone; eta-caprylolactone; and the like.

The amount of lactone employed may vary within considerable limits, depending upon the specific components of the curable system and the degree of fluidity desired. A suitable range for the lactones is from about zero to 13 moles of lactone per epoxy group of the polyepoxide. A more preferred range is from about one-half to 7.5 moles of lactone per epoxy group of the polyepoxide.

The relative proportions as between the low-alkaline alumina hydrate filler and organic binder may vary widely. Generally, the alumina hydrate filler will comprise from about 10 to 80 percent by weight of the over-all filled composition (filler plus binder), although higher or lower amounts occasionally may be employed. A more preferred range for the alumina hydrate is from about 20 to 70 percent by weight of the over-all filled composition, with the most preferred range being from about 40 to 65 percent by weight.

The organo-functional silane coupling agent may be incorporated into the composition by uniformly spraying on the particulate hydrated alumina filler prior to blending. This is by no means the only method of incorporation and it is not our intention to limit the disclosure accordingly.

Other modes of incorporating the organo functional silane coupling agent into the composition within the contemplation of this invention, include blending, atomizing or fluidizing said silane coupling agent, the hydrolysates or condensates thereof, either neat or in solution, with the hydrated alumina filler or by pre-incorporating the silane coupling agent with a suitable component or components (i.e. the liquid resin and the polyol) of the resin binder system and subsequently incorporating the hydrated alumina filler prior to curing.

It is also within the contemplation of this invention to incorporate the silane coupling agent on the surface of the hydrated alumina filler by introducing the silane either neat or in solution into an inert gas stream such as carbon dioxide, nitrogen, methane, argon and the like, and feeding said stream into a cylinder comprising a bed of the filler particles to effect fluidization thereof. Fluidization procedure readily lends itself to a continuous operation scheme.

The incorporation of the hydrated alumina filler into the epoxide binder is generally accomplished by simple blending. Thereafter, the resulting filled composition can be formed into a shaped article of use by any of the usual techniques well known in the art, e.g., casting, molding, impregnating, dipping, encapsulating, and the like.

EXAMPLE

A 180 gram sample of hydrated alumina filler, as crushed precipitate, having an average particle size of 6–10 microns, containing 64–65.5 percent by weight of $Al_2O_3$, 100 p.p.m. of soluble sodium based on a hydrated weight basis and less than 0.25 percent by weight of total sodium as $Na_2O$ on a calcined weight basis, was heated in a container for at least one hour at 120° C. In a separate metal container the following constituents were added at room temperature (i.e. 25° C.); (a) 36 grams of 3,4 - epoxycyclohexylmethyl - 3,4 - epoxycyclohexanecarboxylate, (b) 36 grams of 3,4 - epoxycyclohexylmethyl - 3,4 - epoxycyclohexanecarboxylate modified by a polycaprolactonediol of an average molecular weight of 1250 (the polycaprolactonediol is prepared by reacting a predetermined excess of caprolactone with diethylene glycol) and (c) 1.8 grams of beta(3,4 - epoxycyclohexyl)ethyltrimethoxysilane. This constituent mix was mechanically agitated with a propeller while the temperature was brought to 90° C. and maintained at that temperature by means of a thermostatically controlled jacketed bath. The heated filler, at 120° C. was then slowly manually added during continuous agitation. After filler addition was complete, the metal container was sealed and placed in an oven to age by standing at 48° C. for approximately 24 hours. After aging of the resin composite, the composite was again continuously agitated with the propeller agitator while adding, (d) 48 grams of hexahydrophthalic anhydride (HHPA) hardener and (e) 0.7 gram of benzyldimethylamine catalyst. Complete dispersion was effected after several minutes of agitation and then agitation was discontinued. The metal container was then resealed and deaeration effected by drawing 5 millimeters of Hg vacuum.

Standard ASTM tensile and percent elongation test specimens were cast and the cast specimens were cured in an oven at 120° C. for a period of 2 hours followed by a four hour period at 160° C. These test specimens are hereinafter designated as Sample 1.

The above procedure was repeated except that (c) the silane was omitted. These cast test specimens are hereinafter designated as Sample 2.

The above procedure was repeated except that the hydrated alumina filler employed had an average particle size of 6–10 microns and contained 430 p.p.m. of soluble sodium. These cast specimens are hereinafter designated as Sample 3.

The immediately preceding was repeated except that (c) the silane was absent. These cast test specimens are hereinafter designated as Sample 4.

Comparisons of the average test results of the aforementioned samples is shown below.

TABLE

| Sample No.: | Tensile strength (p.s.i.) | Percent elongation (percent) |
|---|---|---|
| 1 | 6,480 | 0.77 |
| 2 | 4,480 | 0.49 |
| 3 | 8,110 | 1.38 |
| 4 | 5,320 | 0.65 |

ASTM D–638 test procedure was employed in all of the above test specimens.

What is claimed is:

1. A curable epoxy resin, comprising a cycloaliphatic polyepoxide, a curing agent for said cycloaliphatic epoxide, a particulate hydrated alumina filler of the formula $Al_2O_3 \cdot xH_2O$, wherein $x$ has any value from 1 to 3, and an organo-functional silane coupling agent, said silane having the general formula:

$$XR'SiY_3$$

wherein R' is a saturated hydrocarbon radical containing at least 3 carbon atoms in sequence separating X from Si and bonded to both; X is a functional group which is condensible with a carboxylic acid group and Y is a hydrolyzable group, the organo-functional groups of said silane being capable of reacting with the curing agent.

2. The composition of claim 1 wherein the organo-functional silane coupling agent is selected from the group consisting of beta-(3,4-epoxycyclohexyl)ethyltrimethoxysilane, gamma-glycidoxypropyltrimethoxysilane, gamma-aminopropyltrimethoxysilane, and N - beta - (aminoethyl)-gamma-aminopropyltrimethoxysilane.

3. The composition of claim 2 wherein said filler is present in an amount of from about 10 to 80 percent by weight, based on the total weight of binder and filler, on a silane-free basis.

4. The composition of claim 3 wherein said polyepoxide contains at least one oxirane oxygen bonded to two vicinal cycloaliphatic carbon atoms.

5. The composition of claim 4 wherein said polyepoxide is a saturated polyepoxide wherein all the oxirane oxygens are bonded to vicinal cycloaliphatic carbon atoms.

6. The composition of claim 5 wherein said saturated polyepoxide is 3,4 - epoxycyclohexylmethyl - 3,4 - epoxycyclohexanecarboxylate.

7. The composition of claim 4 wherein said cycloaliphatic epoxides are modified by a polyol.

8. The composition of claim 7 wherein said polyol is a polycaprolactone polyol.

9. The composition of claim 8 wherein said polycaprolactone polyol is a polycaprolactonediol having a molecular weight of 1250.

10. The composition of claim 9 wherein said curing agent comprises a polycarboxylic acid anhydride.

11. The composition of claim 10 wherein said polycarboxylic acid anhydride is hexahydrophthalic anhydride.

12. The composition of claim 10 wherein the amount of said polycarboxylic acid anhydride is such as to provide from about 0.16 to 5.0 carboxy groups per epoxy group of said polyepoxide.

13. The composition of claim 7 wherein the amount of said polyol is such to provide up to about 2.0 hydroxy groups per epoxy group of said polyepoxide.

14. The composition of claim 1 wherein said hydrated alumina filler has a total alkaline metal content, expressed as metal oxide, not in excess of 0.25 percent by weight, on a calcined weight basis and said total water-soluble alkaline metal content, expressed as free metal, is not in excess of 100 parts per million by weight on a hydrated basis.

15. The composition of claim 1 wherein said alkaline metal consists essentially of sodium.

16. The composition of claim 3 wherein said filler is alumina trihydrate.

17. The composition of claim 16 wherein said alumina hydrate filler is composed of uneven irregularly shaped particles, and particles having an average particle size of about 6 to 10 microns.

18. The composition of claim 16 wherein said filler is present in an amount of from about 20 to 70 percent by weight, based on the total weight of binder and filler.

19. The composition of claim 16 wherein said filler is present in an amount of from about 40 to 65 percent by weight, based on the total weight of binder and filler.

20. The cured composition of claim 5.

21. An insulating material characterized by improved tensile strength and elongation, excellent resistance to moisture and improved electrical insulating properties, said material comprising a cured epoxy resin, having intimately dispersed therein a particulate alumina hydrate filler of the formula $Al_2O_3 \cdot xH_2O$, wherein $x$ has any value from 1 to 3, and filler being characterized, on a crystal water free basis, by a total alkaline metal content, expressed as metal oxide not in excess of 0.40 percent by weight, determined on a calcined weight basis, and a total water-soluble alkaline metal content, expressed as free metal on a hydrated alumina basis, not in excess of approximately 500 parts per million by weight, a siloxane formed from an organo-functional silane coupling agent present in the precured composition being reactable with a curing agent for said epoxy resin, said silane having the general formula:

$$XR'SiY_3$$

wherein R' is a saturated hydrocarbon radical containing at least 3 carbon atoms in sequence separating X from Si and bonded to both; X is a functional group which is condensible with a carboxylic acid group and Y is a hydrolyzable group, said epoxy resin prior to curing comprising a cycloaliphatic polyepoxide containing at least one oxirane oxygen bonded to two vicinal cycloaliphatic carbon atoms and a curing agent for said polyepoxide.

References Cited
UNITED STATES PATENTS

| | | | |
|---|---|---|---|
| 3,259,518 | 7/1966 | Sterman et al. | 260—37 EP X |
| 3,278,557 | 10/1966 | Chibnik | 260—830 X |
| 3,368,983 | 2/1968 | Tinsley et al. | 260—2 EP X |
| 3,379,653 | 4/1968 | Ernst et al. | 260—37 EP X |
| 3,405,102 | 10/1968 | Kugler et al. | 260—830 X |
| 3,510,444 | 5/1970 | Vandenberg et al. | 260—37 EP |
| 3,268,295 | 8/1966 | Armbrust et al. | 106—288 B X |

LEWIS T. JACOBS, Primary Examiner

U.S. Cl. X.R.

260—830 TW

UNITED STATES PATENT OFFICE
CERTIFICATE OF CORRECTION

Patent No. 3,647,742      Dated March 7, 1972

Inventor(s) John J. Stevens, Jr.

It is certified that error appears in the above-identified patent and that said Letters Patent are hereby corrected as shown below:

Column 7, line 35, in Table, under Preferred Range, "64-65" should read --64-65.5--.

Signed and sealed this 27th day of May 1975.

(SEAL)
Attest:

RUTH C. MASON
Attesting Officer

C. MARSHALL DANN
Commissioner of Patents
and Trademarks